United States Patent [19]

Katoh

[11] 4,248,933
[45] * Feb. 3, 1981

[54] SYNTHETIC RESIN WINDOW MOLDING

[75] Inventor: Hisanori Katoh, Tokyo, Japan

[73] Assignee: Inoue Gomu Kogyo Kabushiki Kaisha, Aichi, Japan

[*] Notice: The portion of the term of this patent subsequent to Jul. 31, 1996, has been disclaimed.

[21] Appl. No.: 1,788

[22] Filed: Jan. 8, 1979

Related U.S. Application Data

[63] Continuation-in-part of Ser. No. 839,752, Oct. 5, 1977, Pat. No. 4,163,076.

[30] Foreign Application Priority Data

Apr. 5, 1977 [JP] Japan .................................. 52/42175

[51] Int. Cl.³ ............................................. B32B 15/08
[52] U.S. Cl. ..................................... 428/339; 52/716; 428/122; 428/332; 428/358; 428/412; 428/457; 428/458; 428/462; 428/463
[58] Field of Search ............... 428/358, 122, 124, 125, 428/126, 337, 339, 332, 334, 335, 458, 462, 463, 457, 412; 52/716

[56] References Cited

U.S. PATENT DOCUMENTS

| 3,155,204 | 11/1964 | Campbell | 52/208 |
|---|---|---|---|
| 3,226,287 | 12/1965 | Shanok et al. | 428/164 |
| 3,440,129 | 4/1969 | Anselm | 428/376 |
| 3,448,550 | 6/1969 | Herr et al. | 52/98 |
| 3,471,979 | 10/1969 | Herr | 52/100 |
| 3,487,420 | 12/1969 | Herr et al. | 52/98 |
| 3,547,516 | 12/1970 | Shanok et al. | 350/97 |
| 3,706,628 | 12/1972 | Azzola | 428/358 X |
| 3,745,056 | 7/1973 | Jackson | 428/157 |
| 3,759,004 | 9/1973 | Kent | 52/400 |
| 3,774,363 | 11/1973 | Kent | 52/400 |
| 3,811,989 | 5/1974 | Hearn | 428/122 |
| 3,914,482 | 10/1975 | Sawa et al. | 428/458 X |
| 3,922,460 | 11/1975 | Jackson | 428/164 |
| 3,934,385 | 1/1976 | Paulus et al. | 428/358 |
| 3,993,819 | 11/1976 | Fewkes | 428/457 |
| 4,042,741 | 8/1977 | Bright | 428/358 |
| 4,094,056 | 6/1978 | Takeda et al. | 29/527.2 |

Primary Examiner—Lorraine T. Kendell
Attorney, Agent, or Firm—Armstrong, Nikaido, Marmelstein & Kubovcik

[57] ABSTRACT

A window molding for a vehicle is provided which comprises a synthetic resin body member which has a center portion, a first end portion at one end of the center portion and a second end portion at the other end of the center portion. A metal foil is bonded to the body member and covers the center portion of the body member and at least a part of the first and second end portions. A soft plastic protective layer is bonded to the metal foil only on the portion of the metal foil which covers the first and second end portions of the body member. The protective layer covers at least a portion of the metal foil which covers part of the first and second end portions of the body member. The protective layer is adapted for forming a protective layer between the metal foil and the body of the vehicle at the first end portion of the body member and between the metal foil and the window of the vehicle at the second end portion of the body member. When the vehicle body is nonmetallic, the protective layer between the metal foil and vehicle body may be eliminated.

49 Claims, 75 Drawing Figures

SYNTHETIC RESIN WINDOW MOLDING

RELATED APPLICATIONS

This application is a continuation-in-part application of my co-pending application Ser. No. 839,752 filed Oct. 5, 1977, now U.S. Pat. No. 4,163,076.

BACKGROUND OF THE INVENTION

1. Field of the Invention

This invention is related to a window molding for a vehicle and more particularly to a window molding for a vehicle which comprises a synthetic resin body member, a metal foil bonded to the body member and soft plastic protective layer means bonded to the foil and covering the end portions of the foil and body member to prevent contact between the foil and the body and window of the vehicle.

2. Description of the Prior Art

Conventional window moldings for direct glazing to the window and body of a vehicle are made of metal foil and synthetic resin which contact a vehicle body or window, but the conventional window moldings are not rigidly fitted thereto. Thus, while the vehicle is running, vibration noises can be generated from the window moldings or the glazed parts can be damaged.

Some conventional window moldings are basically ABS resin, or a polycarbonate resin and do not have the metal portion itself in direct contact with the car body or the glass. However, in this prior art window molding, the resin is hard and the body or glass can thus be damaged by contact with this hard material. In other conventional window moldings, the metal layer may be in contact with the metal body of the vehicle. In this situation, a galvanic reaction can occur causing damage to both the vehicle body and the metal portion of the molding.

SUMMARY OF THE INVENTION

It is an object of the present invention to provide a window molding for a vehicle which eliminates noise and vibration which occur when the vehicle is running.

It is another object of the present invention to provide a window molding for a vehicle which eliminates corrosion resulting from galvanic action caused by the contact between the metal foil of the molding and the metal of the vehicle body.

It is still a further object of the present invention to provide a soft plastic protective layer which is positioned between the molding and the vehicle body and between the molding and the vehicle window to absorb vibration and to eliminate contact between the metal foil of the molding and the metal of the vehicle body.

It is still a further object of the present invention to provide a soft plastic protective layer between a window molding and the window and body of a vehicle in such a manner that it compensates for small gaps and spaces which occur during the assembly of the vehicle.

It is still another object of the present invention to provide a window molding for a vehicle which has various alternative configurations which enables it to be attached to the vehicle in a number of different ways depending upon the construction of the vehicle.

It is still a further object of the present invention to provide a window molding having various configurations, the configurations differing for the purposes of strengthening different portions of the molding and reducing wind resistance of various portions of the molding. The particular configuration used will depend upon the particular requirement of the vehicle on which it is used.

The present invention is directed to a window molding for a vehicle which includes a synthetic resin body member, a metal foil bonded to the body member and soft plastic protective layer means bonded to the metal foil. The synthetic resin body member has a center portion, a first end portion at one end of the center portion and a second end portion at the other end of the center portion. The metal foil covers the center portion of the body member and covers at least a part of the first and second end portions. The soft plastic protective layer is bonded to the metal foil only on the portion of the metal foil which covers the first and second end portions of the body member. The protective layer covers at least a portion of the metal foil which covers the part of the first and second end portions of the body member. The protective layer is adapted for forming a protective layer between the metal foil and the body of the vehicle at the first end portion of the body member. This protective layer absorbs vibration, prevents galvanic corrosion between the metal of the vehicle body and the metal foil, and provides compensation for small gaps which may occur because of manufacturing tolerances in construction of the vehicle. The protective layer also forms a protective layer between the metal foil and the window of the vehicle at the second end portion of the body member. This protective layer absorbs vibration and prevents damage to the window which could be caused by contact between the hard material of the metal foil or synthetic resin body member and the window.

When the window molding of the present invention is used with a vehicle body which is plastic rather than metal, then of course there would be no galvanic reactions between the metal foil and the vehicle body. Therefore, when the vehicle body is plastic, the protective layer means on the right hand side as illustrated in the drawings may be eliminated if desired.

DETAILED DESCRIPTION OF THE PREFERRED EMBODIMENTS

The present invention in all of the embodiments shown is intended to eliminate the drawbacks of conventional moldings and provide a synthetic resin window molding or trim strip which is free from noise vibration and which is less prone to damage from car body vibrations. Furthermore, the moldings of the present invention eliminate any galvanic action between the molding strip and the car body.

In describing the various embodiments of the present invention the same numerical designation will be given to the same elements in the various figures.

Figure 1:
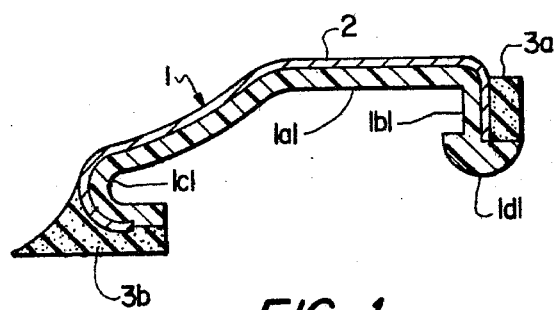
FIGS. 1–2 are sectional views of a window molding for a vehicle according to the present invention.

Referring to FIG. 1, a synthetic resin molding or trim strip 1 (herein after referred to as molding) according to the present invention is in the form of a band with an approximate C-shaped cross section. The body member of the strip has a central portion 1a1, a first end portion 1b1 and a second end portion 1c1. A metal foil such as for example stainless steel or aluminum is bonded to the surface of the body member 1. The metal foil 2 covers the central portion 1a1 and part of the end portions 1b1 and 1c1.

Figure 2:
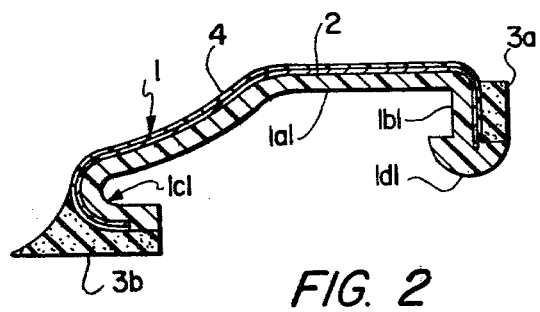

FIG. 2 illustrates an alternative embodiment in which the metal foil 2 is embedded in the synthetic resin of the body member 1.

Where the molding contacts a vehicle body or window, a protective layer of soft plastic material 3a and 3b are provided to prevent direct contact between the metal foil 2 and the vehicle body or window glass.

In FIGS. 1 and 2 the end portion 1b1 of the body member has an anchor 1d1 while the other end portion 1c1 has a bent shape.

The body member 1 may be prepared from a synthetic resin which may be made from rigid plastic materials such as ABS resins, acrylic resins, polycarbonate resins and the like. The metal foil 2 which is bonded on the surface of the resin or embedded therein is formed to a thickness in the range of 30 microns to about 200 mircons. The stainless foil bonded on the resin surface may be coated with a clear synthetic resin material such as polyvinylchloride, cellulose acetate, butyrate resins and the like. The soft plastic protective layers 3a and 3b can be made of materials such as soft polyvinylchloride resin, vinyl acetate resin, and ethylene-vinylacetate copolymer and the like. The thickness of the protective layers 3a and 3b are in the range from about 0.2 mm to about 2 mm.

The molding of the structure shown in FIGS. 1 and 2 as well as in the other embodiments illustrated may be integrally formed by, for example, plastic extrusion molding, as is known in the art.

Figure 3:
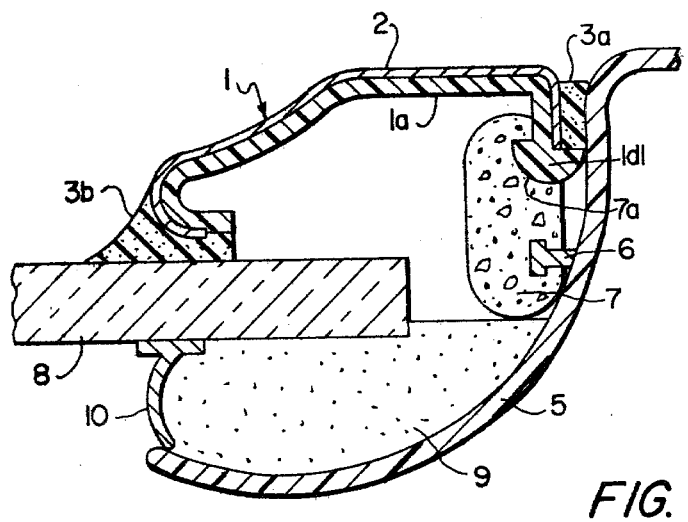
FIG. 3 is a sectional view illustrating the manner in which the moldings of FIGS. 1–2 are attached to a vehicle.

FIG. 3 illustrates the manner in which the molding strip of FIGS. 1 and 2 are attached to a vehicle body. A stud 6 having a T-shape is welded to the car body 5 and a resin or rubber clip 7 is provided for attaching the molding. Anchor 1d1 is placed in a mold-fitting area 7a of the clip 7 as the molding is attached to the car body 5.

After the window glass 8 is placed in the space between the protective layer 3b and the car body 5, a bonding agent 9 such as prepared from polyurethane resin base or Thiokol (tradename, polysulfide synthetic resin rubber of Thiokol Chemical Corporation) is applied between window glass 8 and the car body 5. A bonding stopper 10 supports the window glass.

The protective layer 3a which is positioned between the metal foil 2 and the car body 5 separates these two metal elements thereby eliminating galvanic action between these two metals which could result in corrosion of the car body. The protective layer 3b absorbs vibrations of the glass 8 and thereby eliminates noise which resulted in conventional moldings as a result of the vibration of the glass as it rubbed against the molding strip and other elements of the vehicle.

FIGS. 4–10 illustrate alternative embodiments of the molding strip of the present invention. Each of the embodiments illustrated in FIGS. 4–10 include an anchor 1e1 on end portion 1b1 of the body member 1.

In FIGS. 4, 7, 9 and 10, the end portion 1b1 includes an extension 1f1 which increases the stiffness of the trim against twisting.

Figure 4:
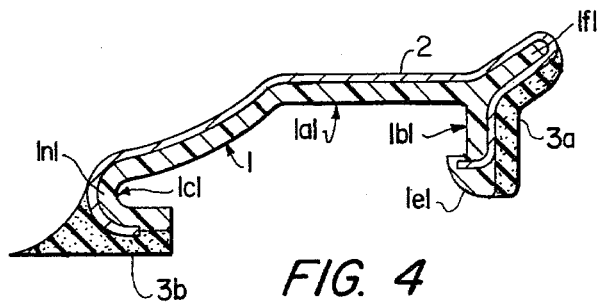
FIGS. 4–10 are sectional views illustrating alternative embodiments of the present invention.
Figure 5:
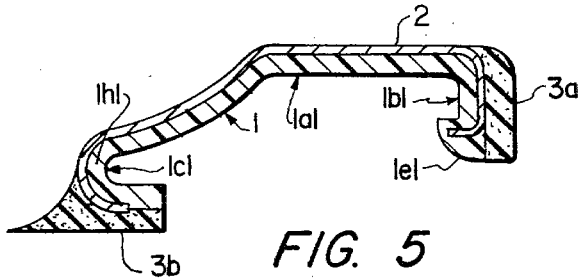

In FIGS. 4 and 5, the end portion 1c1 has a bent portion 1n1 which increases the stiffness and strength of the end portion 1c1.

Figure 8:
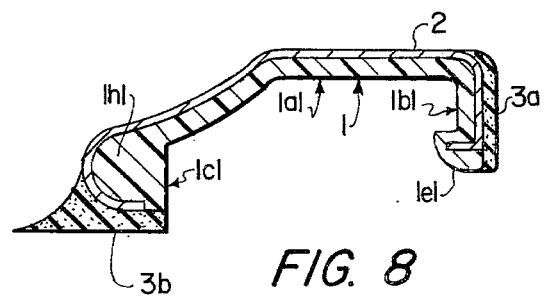
Figure 9:
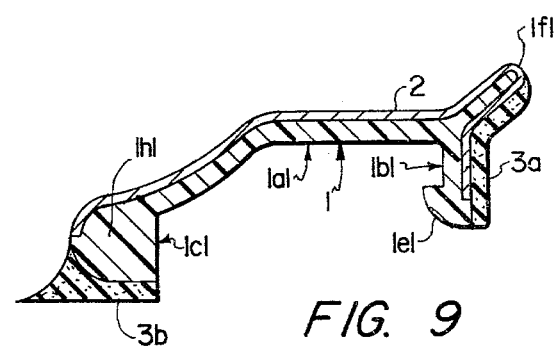
Figure 6:
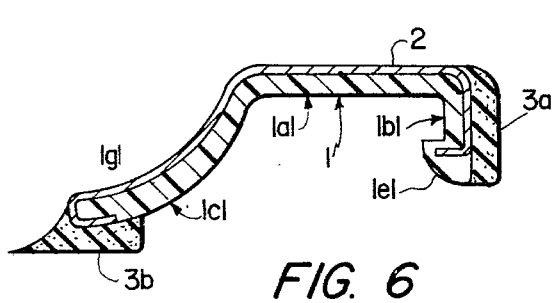
Figure 10:
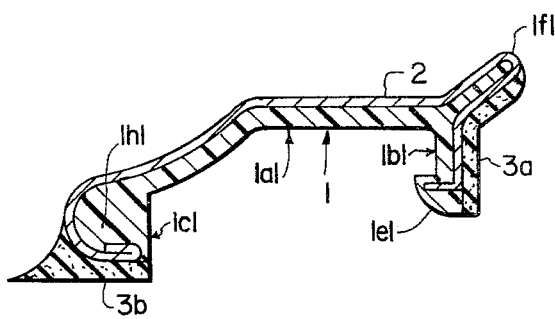
Figure 7:
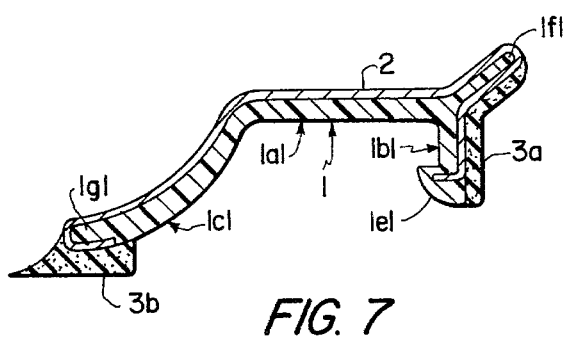

In FIGS. 8, 9 and 10, the end portion 1c1 includes a thickened portion 1h1 which also strengthens the end portion 1c1.

Figure 11:
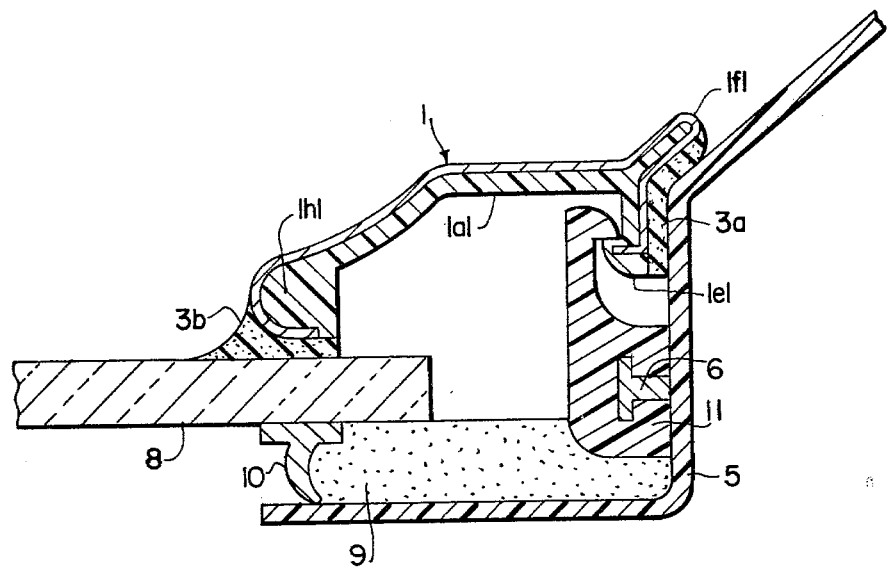
FIG. 11 is a sectional view illustrating the attachment of the moldings of FIGS. 4–10 to a vehicle.

FIG. 11 illustrates the manner in which the molding strip of FIGS. 4–10 may be attached to a vehicle. This is done in the manner somewhat similar to that illustrated in FIG. 3.

Figure 12:
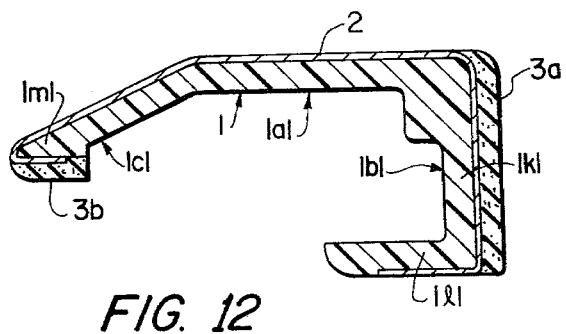
FIGS. 12–14 are sectional views illustrating further alternative embodiments of the present invention.
Figure 13:
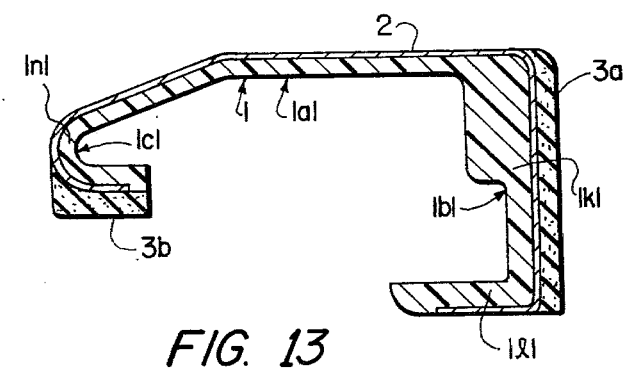
Figure 14:
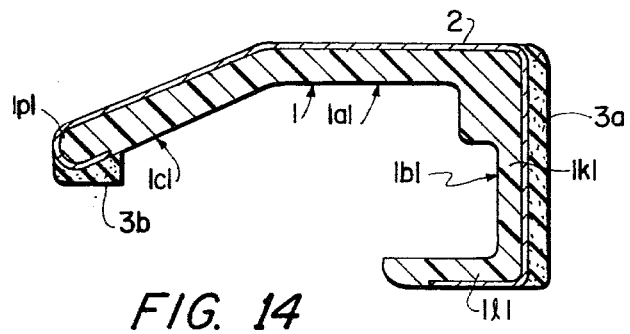

FIGS. 12–14 illustrate an alternative embodiment of the molding of the present invention in which the end portion 1b1 includes a leg having a first part 1k1 which is perpendicular to the center portion 1a1 and a second part 1l1 which extends from the first part perpendicular thereto.

In FIG. 12, end portion 1c1 has a tapered part 1m1 which decreases wind resistance of the molding. In FIG. 13 end portion 1c1 has a bent portion 1n1 which increases the strength and stiffness of the end portion 1c1. In FIG. 14 end portion 1c1 has a straight portion 1p1.

Figure 15:
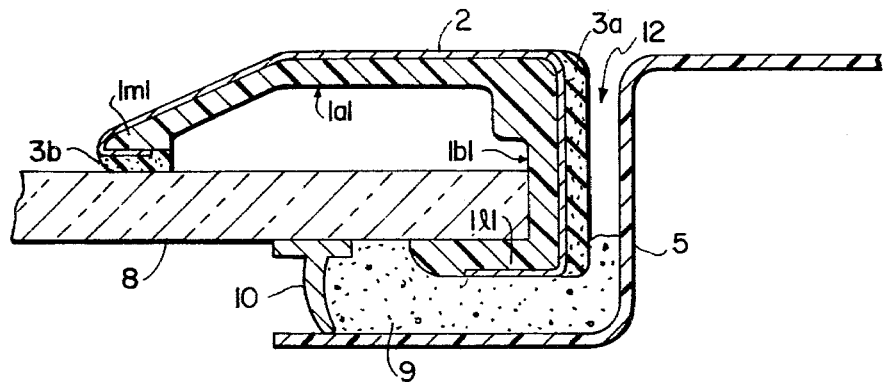
FIG. 15 is a sectional view illustrating the attachment of the moldings of FIGS. 12–14 to a vehicle.

FIG. 15 illustrates an example of the manner in which the molding strip of FIGS. 12–14 may be attached to a vehicle. With the embodiments of FIGS. 12–14, a space 12 is formed between the vehicle body 5 and the protective layer 3a.

Figure 16:
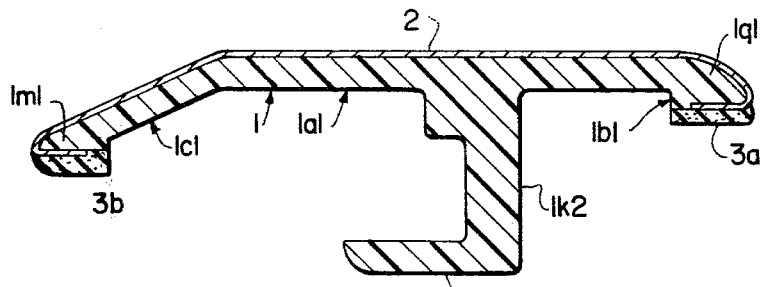
FIGS. 16–24 are sectional views illustrating further alternative embodiments of the present invention.
Figure 17:
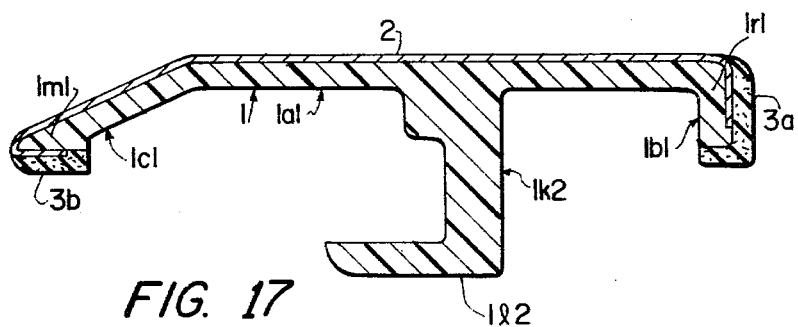
Figure 18:
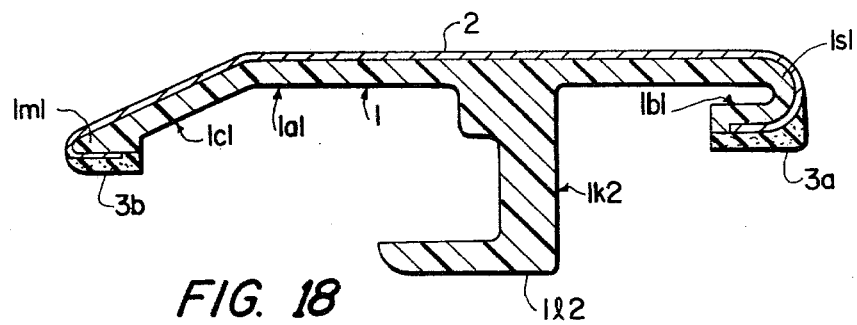
Figure 19:
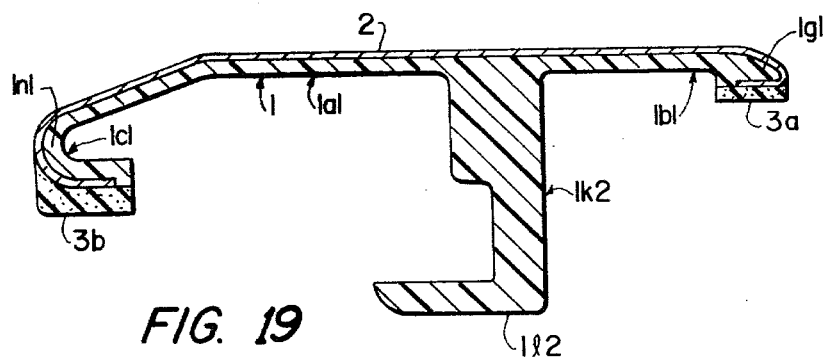
Figure 20:
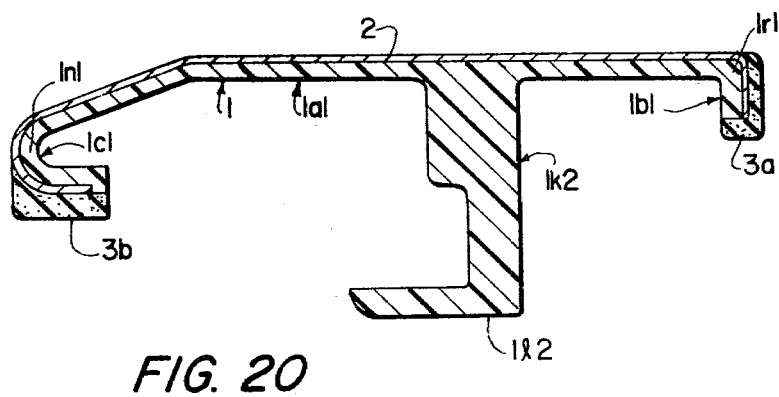
Figure 21:
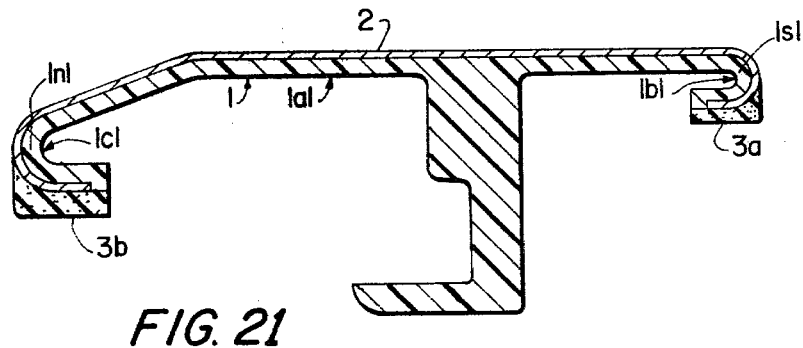
Figure 22:
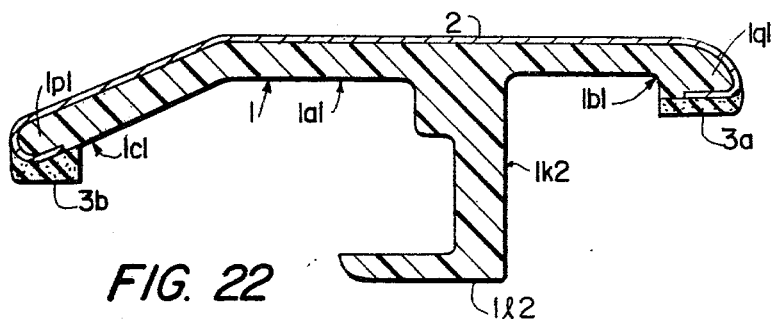
Figure 23:
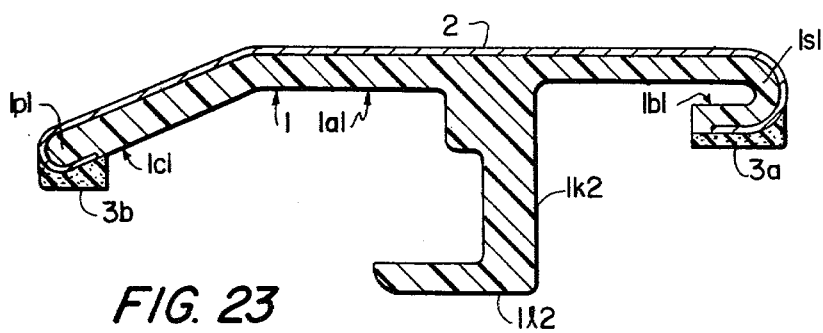
Figure 24:
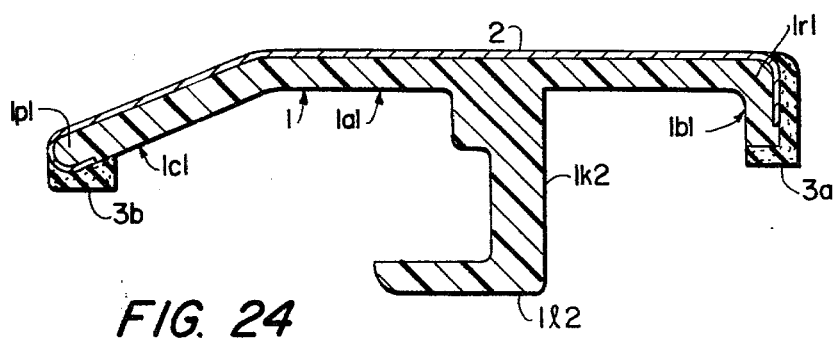

FIGS. 16-24 illustrate still another embodiment of the molding of the present invention. In the embodiments of all of these figures, the body member 1 has a leg extending from the central portion 1a1, the leg including a first portion 1k2 perpendicular to the central portion 1a1 and a second portion 1l2 which extends from portion 1k2 and is perpendicular thereto. In the embodiments of FIGS. 16-18 end portion 1c1 has a tapered part 1m1 which decreases with resistance. In FIGS. 19-21 end portion 1c1 has a bent portion 1n1 which increases the strength and stiffness of the end portion 1c1. In FIGS. 22-24 the end portion 1c1 has a straight portion 1p1.

In FIGS. 16, 19 and 22 end portion 1b1 has a tapered part 1q1 which reduces with resistance. In FIGS. 17, 20 and 24 end portion 1b1 has an end 1r1 which is perpendicular to the central portion 1a1. This end portion 1b1 is used where the vehicle body has a step formed therein. In FIGS. 18, 21 and 23 end portion 1b1 has a bent portion 1s1 which increases the stiffness and strength of the end portion 1b1.

Figure 25:
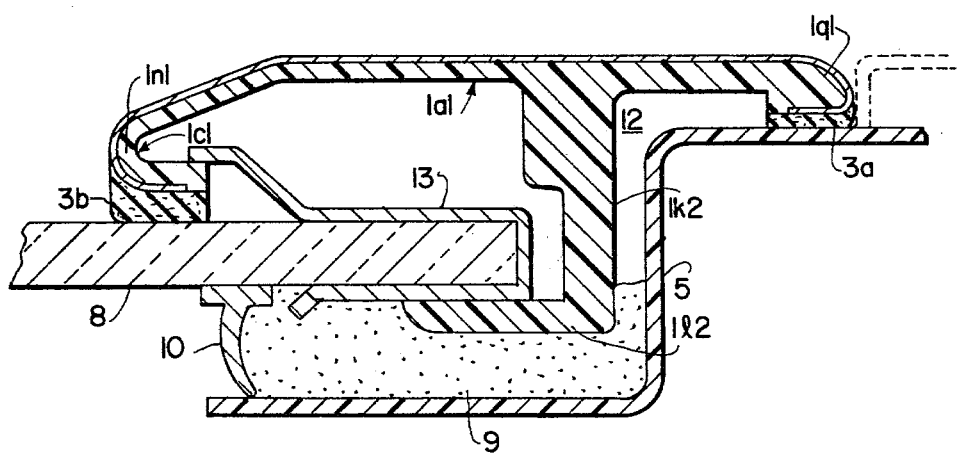
FIG. 25 is a sectional view illustrating the attachment of the moldings of FIGS. 16–24 to a vehicle.

FIG. 25 illustrates the manner in which the molding of FIGS. 16-24 can be attached to the vehicle. A clip 13 is used to hold the end portion 1c1 against the glass 8. An arrangement such as shown in FIG. 25 can also be used to attach the moldings of FIGS. 12-14 to a vehicle and an arrangement such as shown in FIG. 15 can be used to attach the moldings illustrated in FIGS. 16-24 to the vehicle.

FIGS. 26-34 illustrate further embodiments of the present invention. In all of these figures, the body member 1 includes a leg which extends from the central portion 1a1 of the body member. The leg includes a first part 1u2 and an anchor 1d2 which is attached to the end of the leg 1u2.

Figure 26:
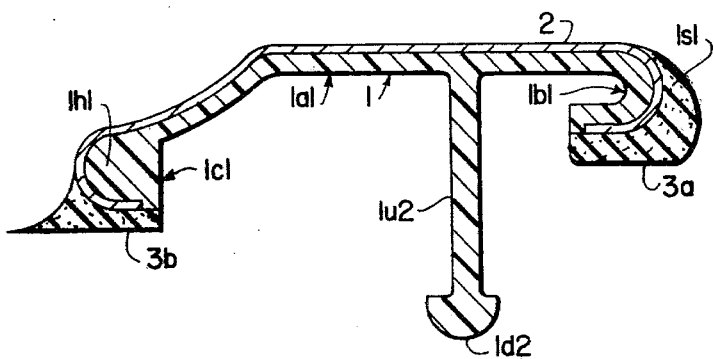
FIGS. 26–34 are sectional views illustrating still further alternative embodiments of the present invention.
Figure 27:
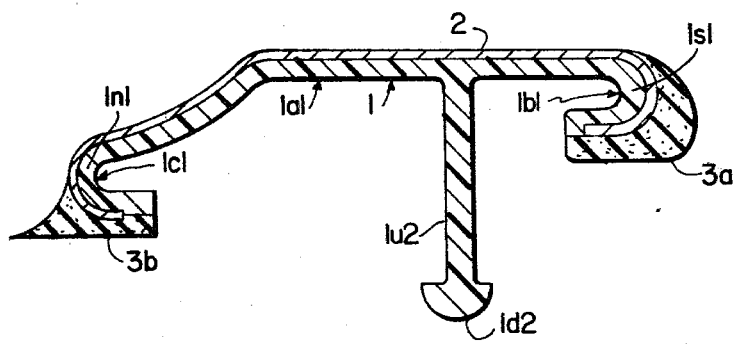
Figure 28:
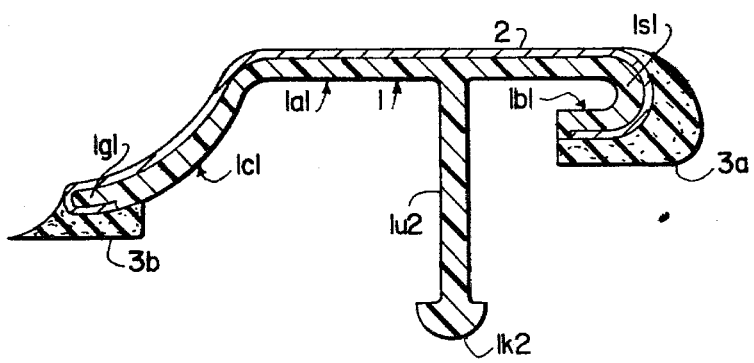
Figure 29:
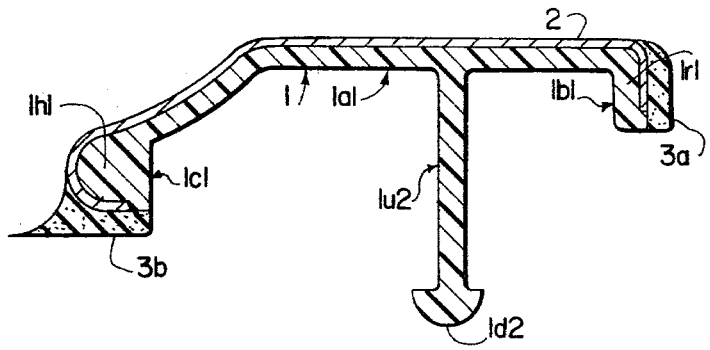
Figure 30:
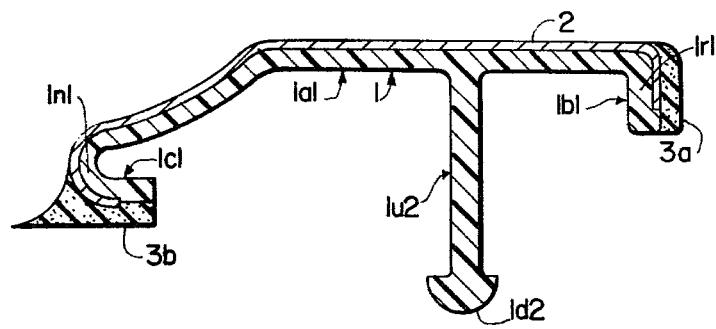
Figure 31:
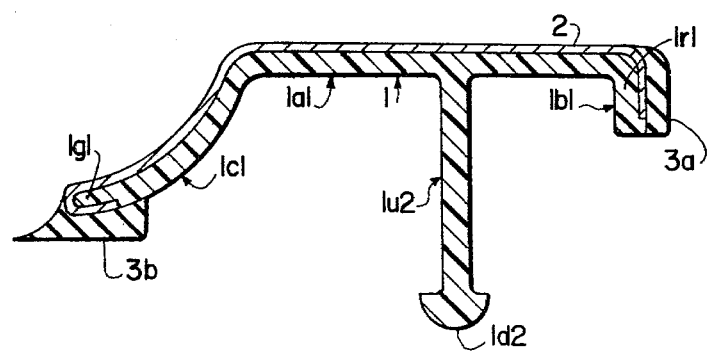

In the embodiments of FIGS. 26, 27 and 28 end portion 1b1 of the body member includes a bent portion 1s1 which increases the strength and stiffness of the end portion 1b1. In FIGS. 29-31 end portion 1b1 includes a bent portion 1r1 which is used when the vehicle body includes a step.

Figure 32:
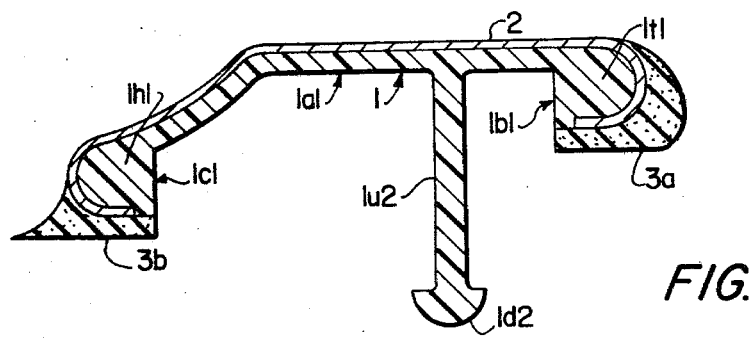
Figure 33:
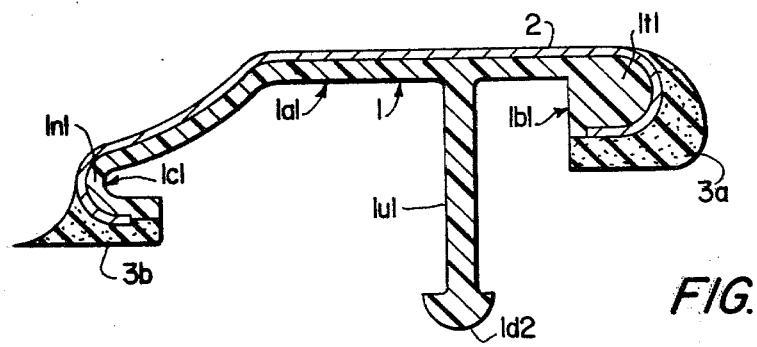
Figure 34:
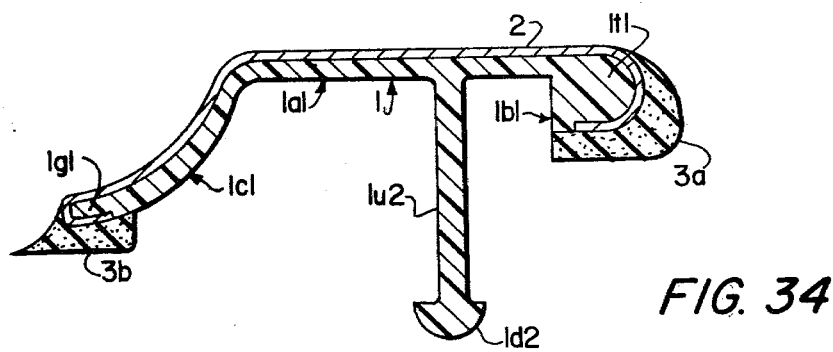

In FIGS. 32-34 end portion 1b1 includes a thickened portion 1t1 which enhances the strength of the end portion 1b1.

In FIGS. 26, 29 and 32 end portion 1c1 includes a thickened portion 1h1 which increases the strength of the end portion 1c1. In FIGS. 27, 30 and 33 end portion 1c1 includes a bent portion 1n1 which increases the strength and stiffness of the end portion 1c1. In FIGS. 28, 31 and 34 end portion 1c1 includes straight portions 1g1.

Figure 35:
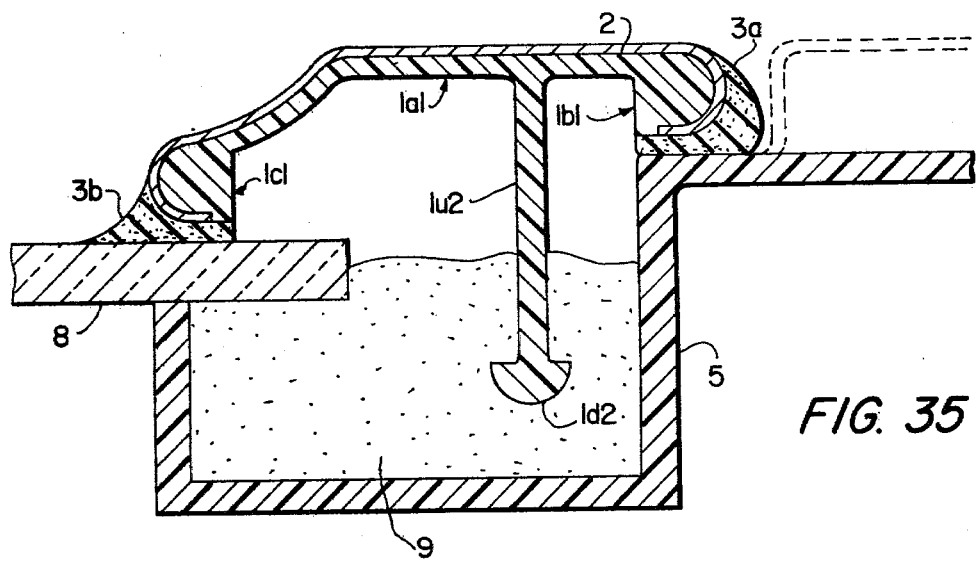
FIG. 35 is a sectional view illustrating the attachment of the moldings of FIGS. 26–34 to a vehicle.

FIG. 35 illustrates the manner in which the embodiments of FIGS. 26-34 are attached to a vehicle. The leg portion 1u2 and anchor portion 1k2 are embedded in a bonding material 9. The leg and anchor will firmly hold the molding against the vehicle body 5 and window 8.

Figure 36:
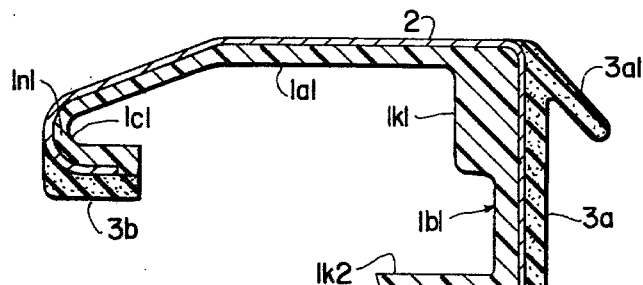
FIG. 36 is a sectional view illustrating still another alternative embodiment of the present invention.

FIG. 36 illustrates an embodiment which is similar to that shown in FIG. 13; however, in the embodiment shown in FIG. 36, the protective layer includes an extended portion or seal lip 3a1. The seal lip 3a1 can also be included on embodiments such as illustrated in FIGS. 12 and 14.

Figure 37:
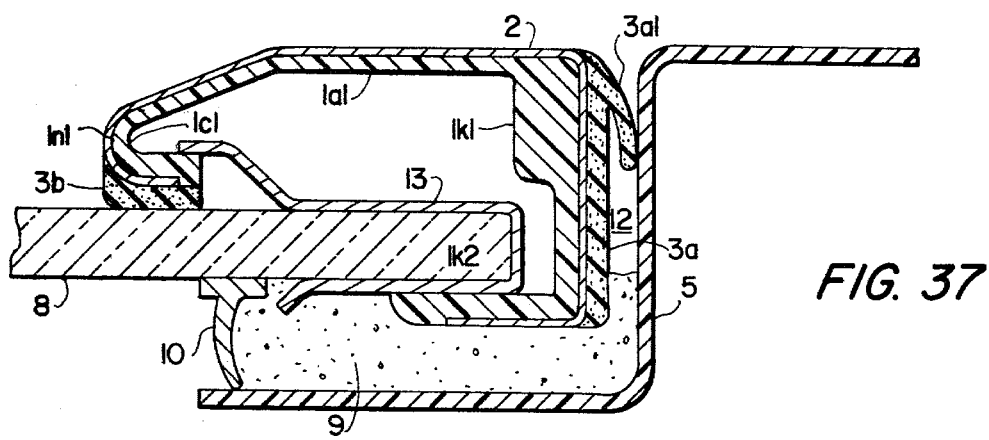
FIG. 37 is a sectional view illustrating the attachment of the molding of FIG. 36 to a vehicle.

FIG. 37 illustrates the manner in which the molding of FIG. 36 is attached to a vehicle. A clip 13 is used to hold the molding strip to the window 8. The space 12 between the protective layer 3a and the car body 5 is enclosed by the seal lip 3a1. Also, the manner of attaching the embodiment of FIG. 36 to the vehicle as illustrated in FIG. 37 can also be used in connection with FIG. 13 and likewise, if extension 3a1 is used in connection with the embodiment of FIGS. 12 and 14, then the embodiment of FIG. 15 can be used to attach the molding strip to the vehicle.

Figure 38:
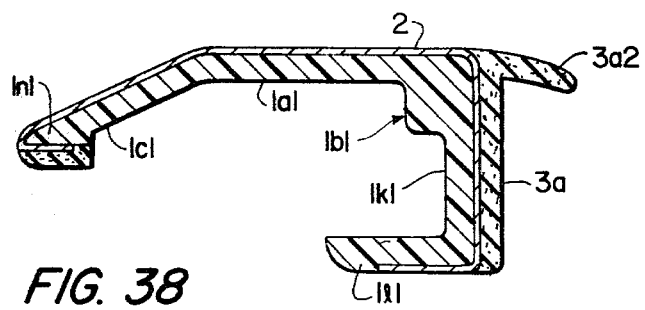
FIG. 38 is still a further alternative embodiment of the present invention.

FIG. 38 illustrates still another alternative embodiment of the present invention. FIG. 38 differs from FIG. 37 in that in FIG. 37 the extension or seal lip 3a1 extends downward, whereas in FIG. 38 the seal lip or extension 3a2 extends in more of an outward direction. The other portions of FIG. 38 are similar to that illustrated in FIG. 36 and again the protective layer 3a with seal lip 3a2 illustrated in FIG. 38 can be used with any of the embodiments of FIGS. 12, 13 and 14.

Figure 38A:
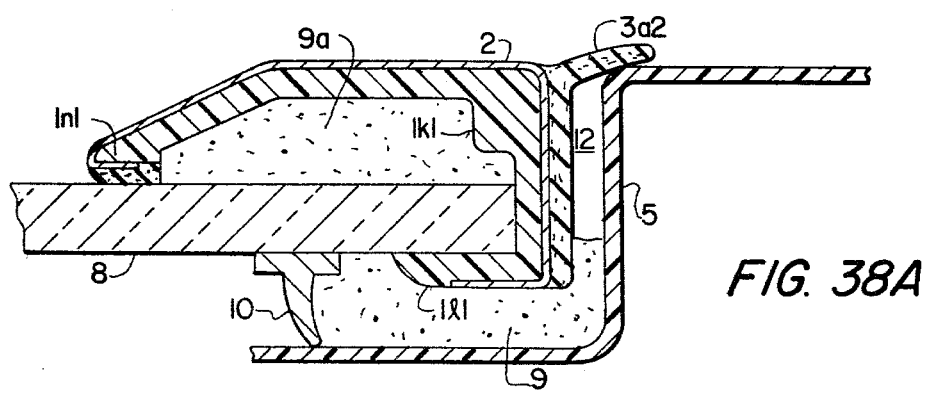
FIG. 38A is a sectional view illustrating the attachment of the molding of FIG. 38 to a vehicle.

FIG. 38A illustrates the manner in which the embodiment of FIG. 38 is attached to a vehicle. Seal lip 3a2 covers the space 12, thereby preventing dirt, grease, water, etc. from entering the space. The seal lip thus prevents damage to the vehicle body in the area of space 12. This of course is the same advantage as the seal lip 3a1 in FIG. 36. The manner of attaching the molding to the car body illustrated in FIG. 38A uses adhesive 9 as well as adhesive 9a in the space between the molding and the glass 8. This manner of attachment can be used with all the embodiments of FIGS. 12-14 and likewise the manner of attachment in FIG. 15 can be used to attach the molding of FIG. 38 to a vehicle.

Figure 39:
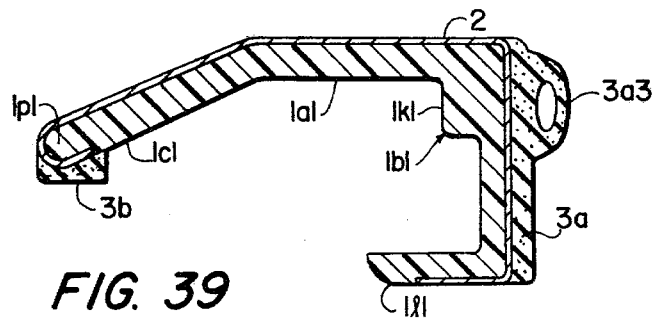
FIG. 39 is a sectional view illustrating still another alternative embodiment of the present invention.

FIG. 39 illustrates still another alternative embodiment in which the protective layer 3a includes a tubular seal 3a3. In FIG. 39 the body member 1a1 corresponds to that illustrated in FIG. 14; however, the protective layer 3a including the tubular seal 3a3 can also be used with the embodiments of FIG. 12 and FIG. 13.

Figure 40:
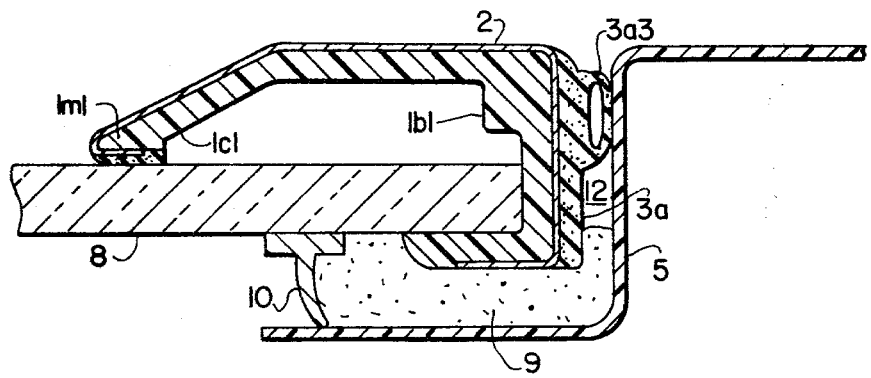
FIG. 40 is a sectional view illustrating the attachment of the molding of FIG. 39 to a vehicle.

FIG. 40 illustrates the manner in which the embodiment of FIG. 39 is attached to the vehicle. In FIG. 40, the body member of FIG. 12 is used rather than that of FIG. 14. The tubular seal 3a3 seals the space 12 formed between the bottom portion of protective layer 3a3 and the body 5. This seal prevents water, dirt, etc. from entering the space 12, thereby preventing corrosion of the vehicle.

Figure 41:
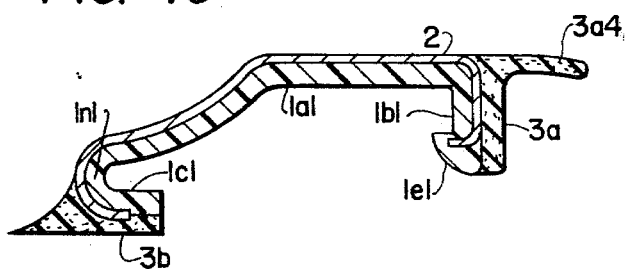
FIG. 41 is a sectional view illustrating a further alternative embodiment of the present invention.

FIG. 41 illustrates still another alternative embodiment of the present invention in which protective layer 3a includes an extension or seal lip 3a4 which extends outwardly from the protective layer 3a. FIG. 41 illustrates this protective layer used in conjunction with the embodiment of FIG. 5. The protective layer 3a, with the seal lip 3a4 can, however, also be used with the embodiments of FIGS. 6 and 8.

Figure 42:
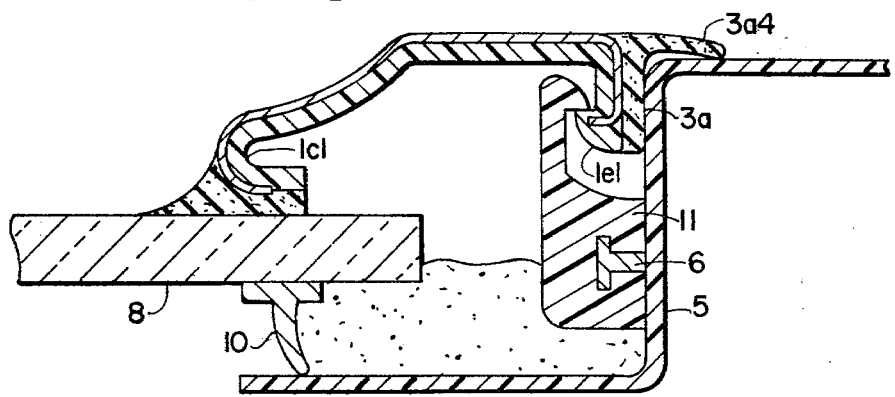
FIG. 42 is a sectional view illustrating the attachment of the molding of FIG. 41 to a vehicle.
Figure 43:
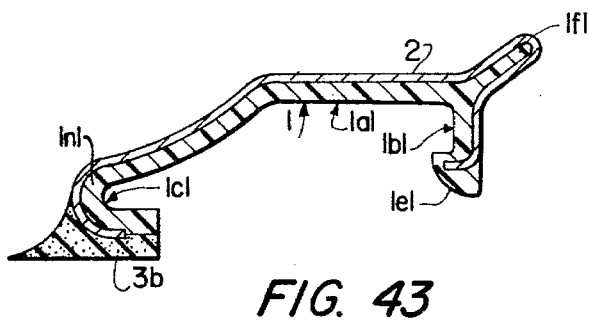
FIGS. 43–49 are sectional views illustrating still further alternative embodiments of the present invention.
Figure 47:
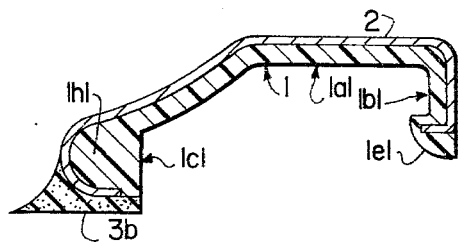
Figure 44:
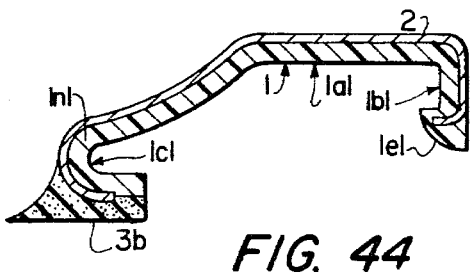
Figure 48:
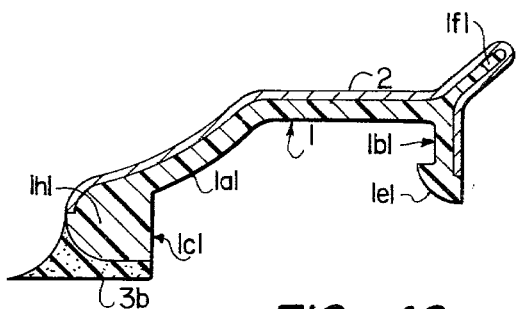
Figure 45:
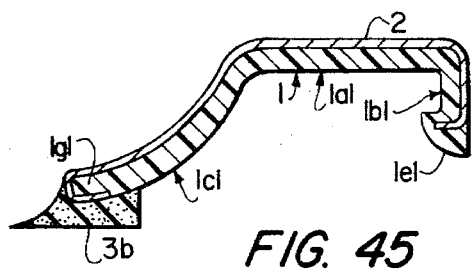
Figure 49:
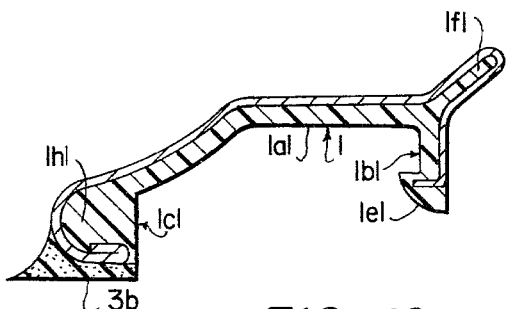
Figure 46:
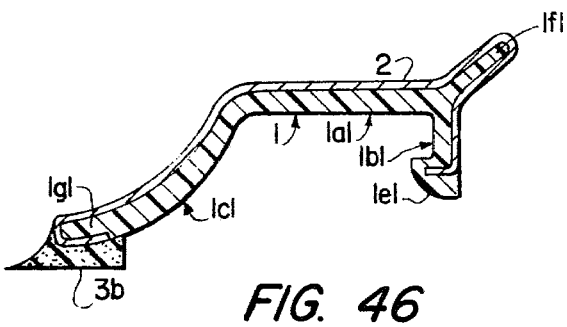
Figure 50:
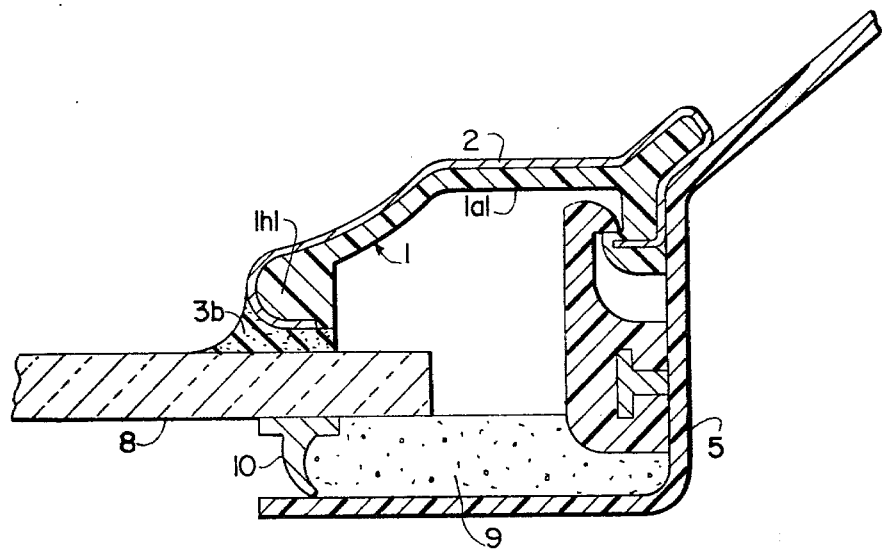
FIG. 50 is a sectional view illustrating the attachment of the moldings of FIGS. 43–49 to a vehicle.
Figure 51:
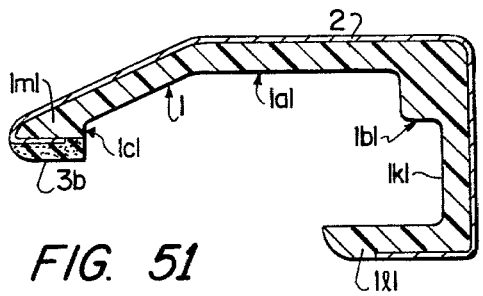
FIGS. 51–53 are sectional views illustrating still further alternative embodiments of the present invention.
Figure 52:
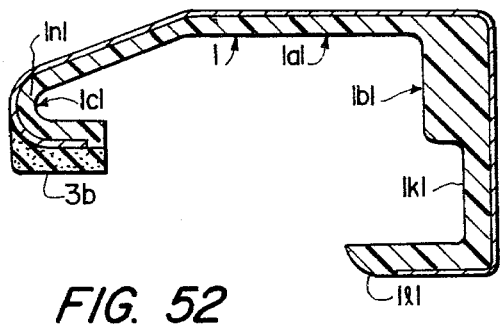
Figure 53:
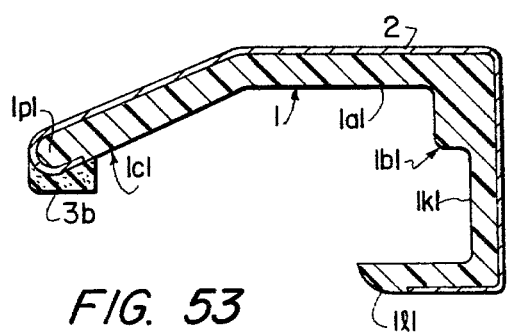
Figure 54:
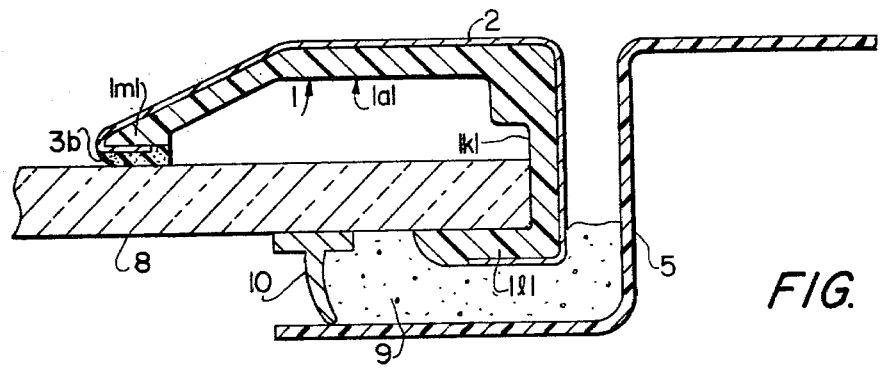
FIG. 54 is a sectional view illustrating the attachment of the molding of FIGS. 51–53 to a vehicle.
Figure 55:
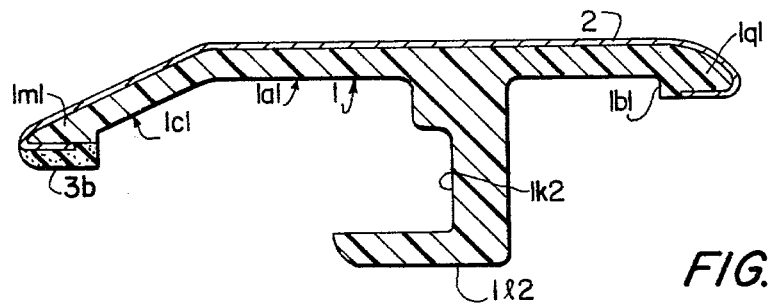
FIGS. 55–63 are sectional views illustrating still further alternative embodiments of the present invention.
Figure 56:
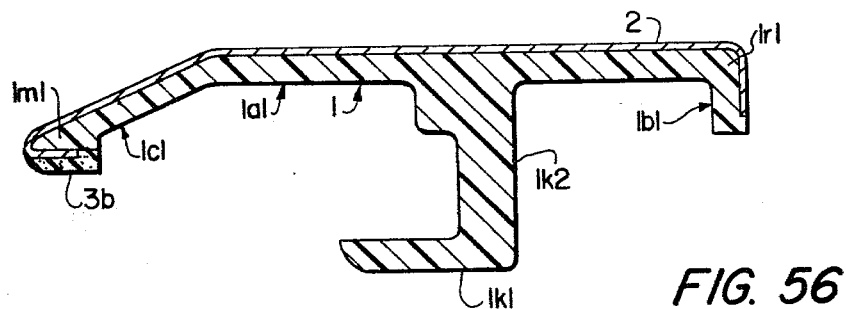
Figure 57:
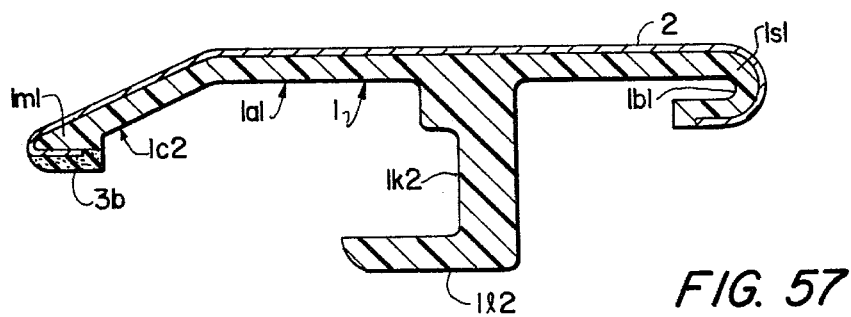
Figure 58:
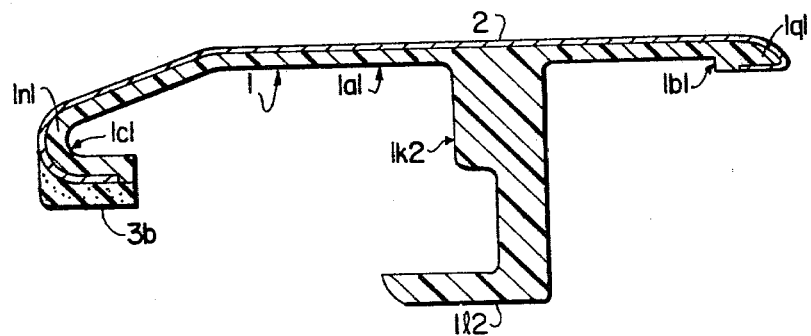
Figure 59:
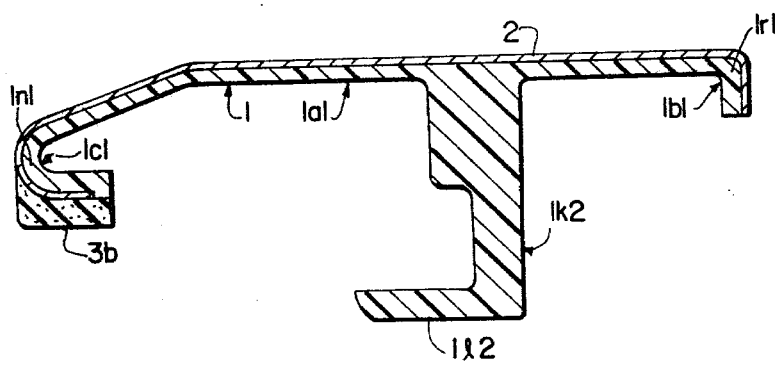
Figure 60:
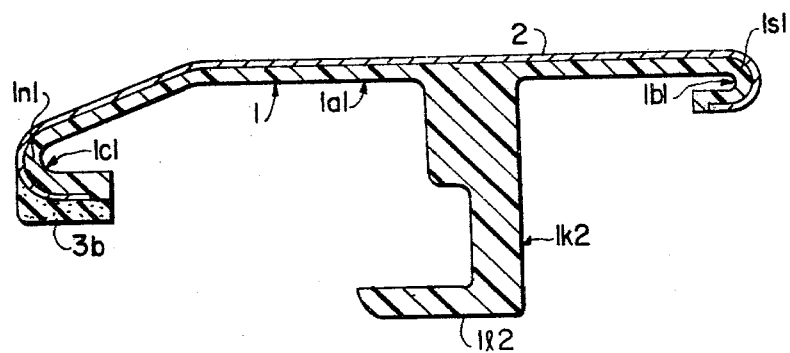
Figure 61:
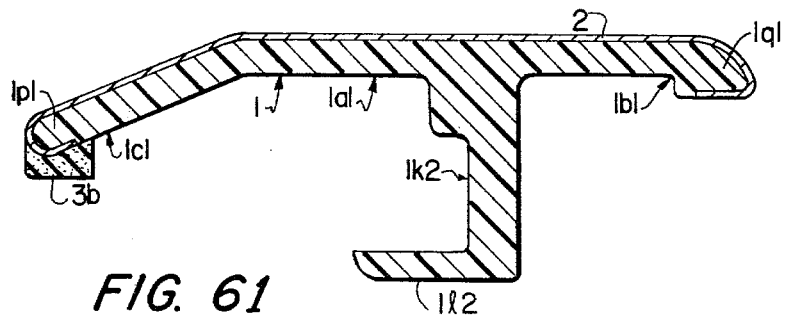
Figure 62:
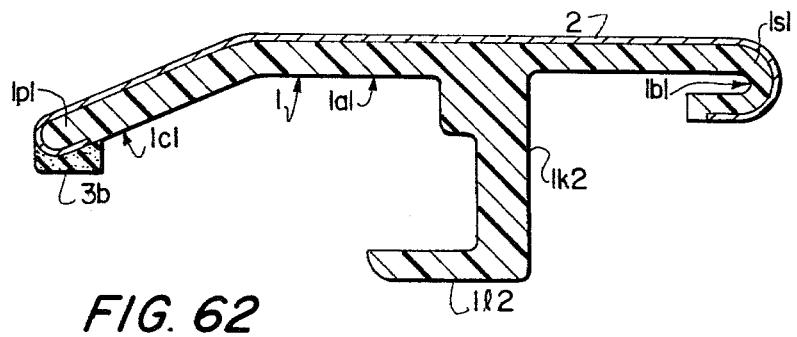
Figure 63:
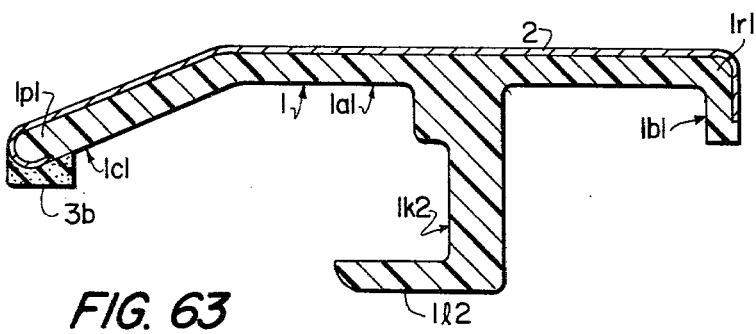
Figure 64:
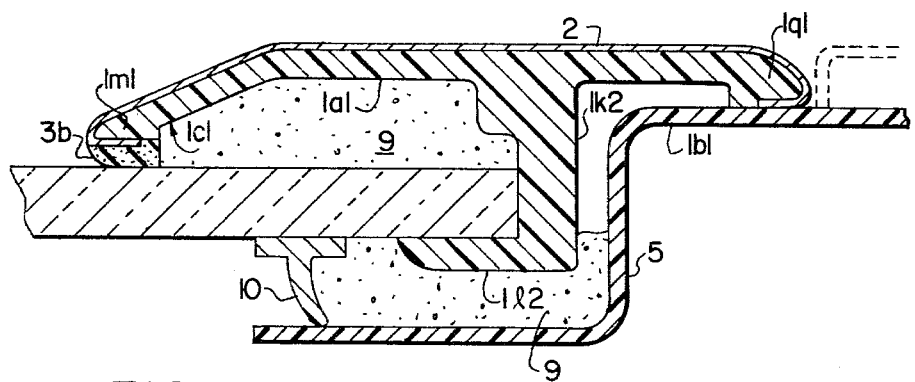
FIG. 64 is a sectional view illustrating the attachment of the moldings of FIGS. 55–63 to a vehicle.
Figure 65:
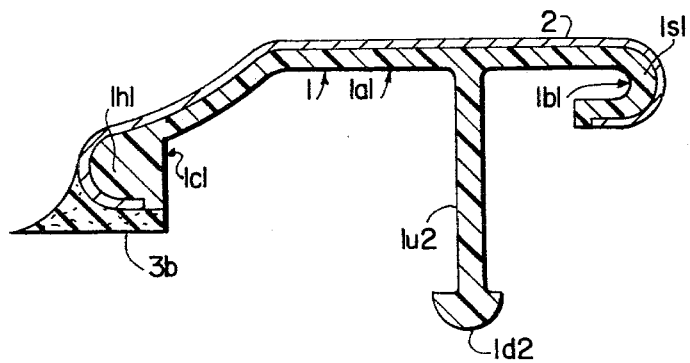
FIGS. 65–73 are sectional views illustrating still further alternative embodiments of the present invention.
Figure 66:
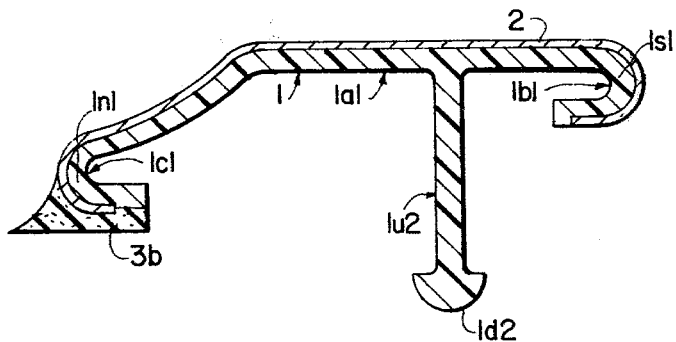
Figure 67:
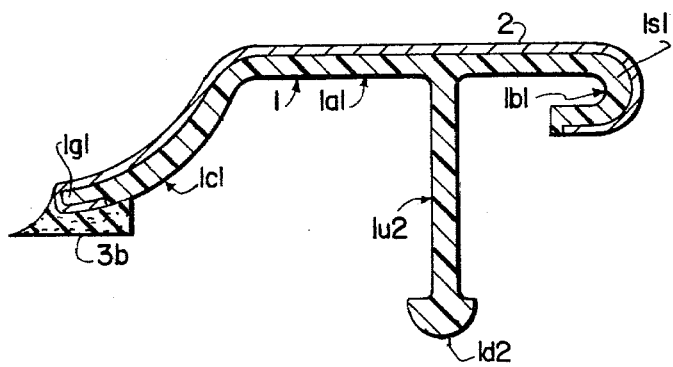
Figure 68:
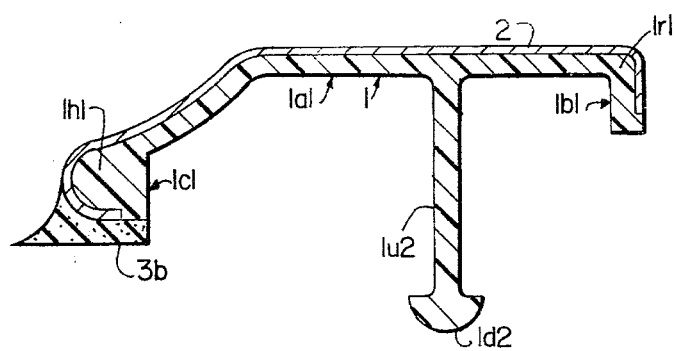
Figure 69:
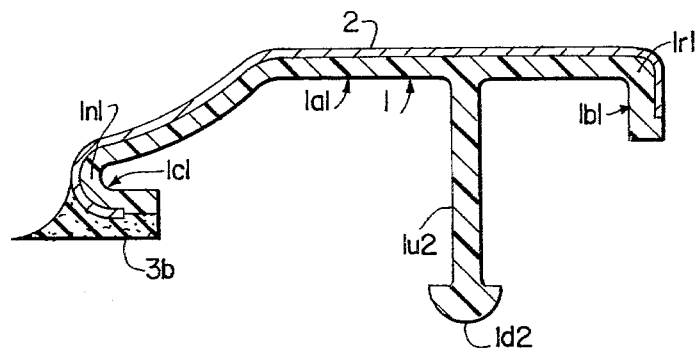
Figure 70:
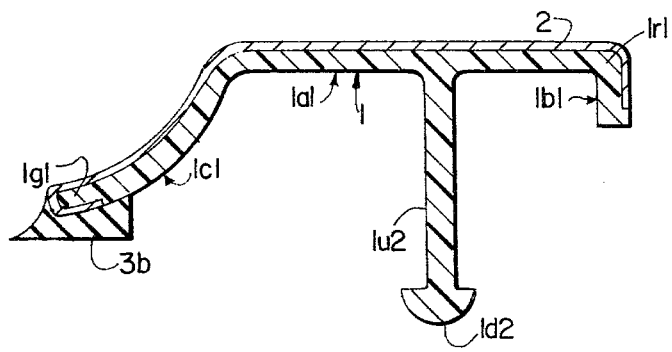
Figure 71:
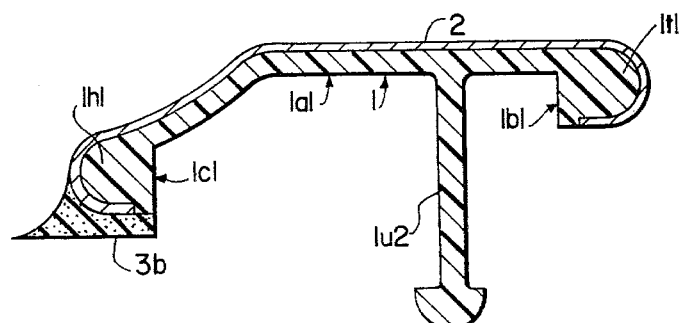
Figure 72:
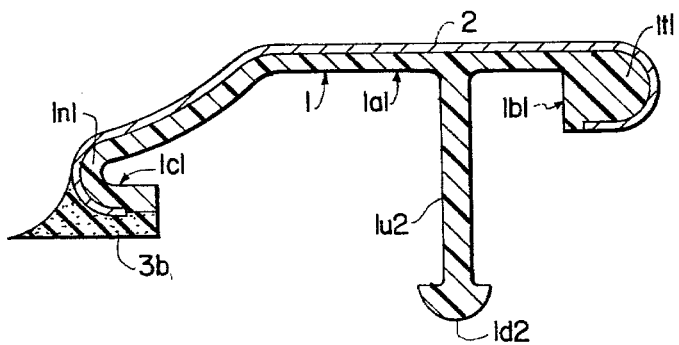
Figure 73:
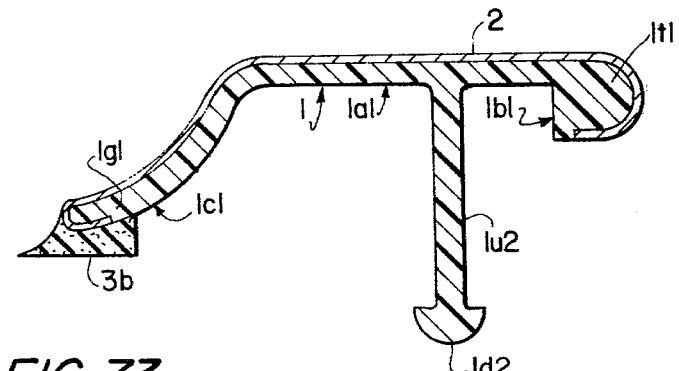
Figure 74:
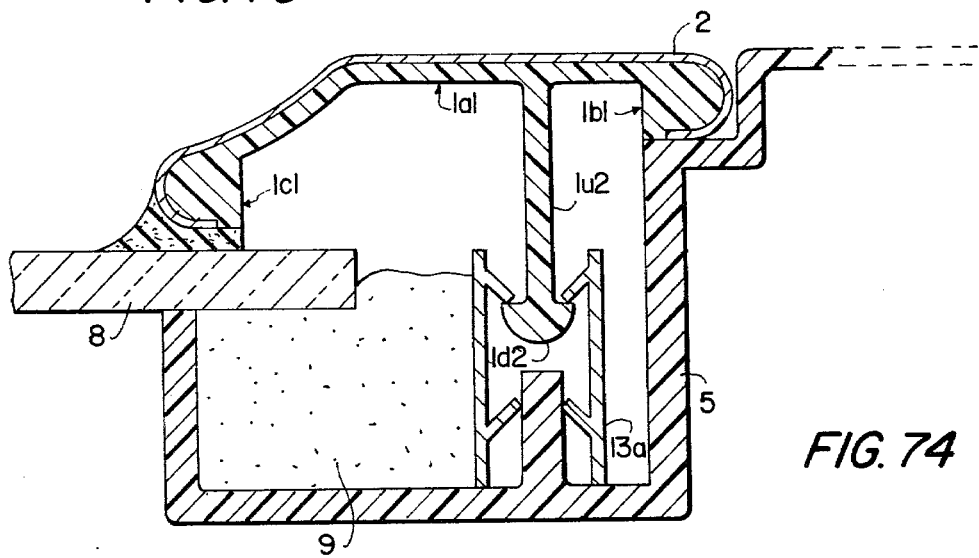
FIG. 74 is a sectional view illustrating the attachment of the moldings of FIGS. 65–73 to a vehicle.

FIG. 42 illustrates the manner in which the embodiment of FIG. 41 is attached to a vehicle. The manner of attachment is similar to that illustrated in FIG. 11, except that instead of the extension 1f1, the seal lip 3a4 forms a seal with the vehicle body 5. This seal provides added protection for the prevention of water or dirt entering the space between the vehicle body and the clip 11.

When a vehicle body is constructed of plastic, or other non-metallic material, then in all the embodiments illustrated in FIGS. 4-35 there would be no galvanic corrosion resulting from the contact between metallic foil 2 and the vehicle body. Thus, when a non-metallic vehicle body such as a plastic vehicle body is used in the embodiments of FIGS. 4-37, the protective layer 3a may be eliminated. FIGS. 43-74 illustrate the various embodiments of FIGS. 4-35 in which the protective layer 3a has been eliminated. Although the protective layer 3a may be eliminated, when the molding is used with a non-metallic vehicle body, it is not required and in fact, the use of the protective layer with the non-metallic body offers the advantages of reduction of vibration and compensation for manufacturing tolerances which may occur with even a non-metallic body.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

I claim:

1. A window molding for a vehicle comprising:
   (a) a synthetic resin body member, said body member having a center portion, a first end portion at one end of said center portion and a second end portion at the other end of said center portion;
   (b) a metal foil bonded to said body member, said metal foil having first, second and third portions, said first portion of said foil covering at least a part of said first end portion of said body member, said second portion of said foil covering at least a part of said second end portion of said body member, and said third portion of said foil covering said center portion of said body member; and
   (c) soft plastic protective layer means, bonded to at least a part of said first and second portions of said metal foil, said protective layer means bonded to said first portion of said metal foil being adapted for forming a protective layer between said metal foil and the body of the vehicle at said first end portion of said body member and said protective layer means bonded to said second portion of said metal foil being adapted for forming a protective layer between said metal foil and the window of a vehicle at said second end portion of said body member.

2. A window molding as set forth in claim 1 wherein said first end portion includes an anchor means for coupling said window molding to the vehicle.

3. A window molding as set forth in claim 2 wherein said first portion of said metal foil extends into said anchor means.

4. A window molding as set forth in claim 2 wherein said first end portion includes an extension means for increasing the stiffness of said molding.

5. A window molding as set forth in claims 2, 3 or 4, wherein said second end portion is bent to increase the strength thereof.

6. A window molding as set forth in claims 2, 3 or 4, wherein said second end portion is thicker than said center portion whereby said second end portion is stiffened.

7. A window molding as set forth in claim 1 wherein said first end portion includes a leg means having a first part perpendicular to the end of the center portion and extending therefrom and a second part extending from the first part perpendicular thereto.

8. A window molding as set forth in claim 7 wherein said second end portion is tapered for reducing wind resistance.

9. A window molding as set forth in claim 7 wherein said second end portion is bent to increase the strength thereof.

10. A window molding as set forth in claim 1 including a leg means extending from said center portion, said leg means including a first part extending from the center portion perpendicular thereto and a second part extending from the first part and perpendicular thereto.

11. A window molding as set forth in claim 10 wherein said first end portion is tapered to reduce wind resistance.

12. A window molding as set forth in claim 10 wherein said first end portion is positioned perpendicular to said center portion.

13. A window molding as set forth in claim 10 wherein said first end portion is bent to increase the strength thereof.

14. A window molding as set forth in claims 11, 12 or 13 wherein said second end portion is tapered to reduce wind resistance.

15. A window molding as set forth in claims 11, 12 or 13 wherein said second end portion is bent to increase the strength thereof.

16. A window molding as set forth in claim 1 including a leg means extending from said center portions, said leg means including an anchor means at one end thereof.

17. A window molding as set forth in claim 16 wherein said first end portion is bent to increase the strength thereof.

18. A window molding as set forth in claim 16 wherein said first end portion is positioned perpendicular to said center portion.

19. A window molding as set forth in claim 16 wherein said first end portion is thicker than said center portion to increase the strength thereof.

20. A window molding as set forth in claims 17, 18 or 19 wherein said second end portion is thicker than said center portion to increase the strength thereof.

21. A window molding as set forth in claims 17, 18 or 19 wherein said second end portion is bent to increase the strength thereof.

22. A window molding as set forth in claims 1, 2, 3, 7, 8 or 9 wherein said protective layer means covering said first end portion includes a seal lip means extending outwardly from said body member for contacting the body of the vehicle and forming a seal therewith.

23. A window seal as set forth in claim 1, 7, 8 or 9 wherein said protective layer covering said first end portion includes a tubular sealing means extending outwardly from said body member for contacting the body of the vehicle and forming a seal therewith.

24. A window molding for a vehicle comprising:
   (a) a synthetic resin body member, said body member having a center portion, a first end portion at one end of said center portion and a second end portion at the other end of said center portion;
   (b) a metal foil bonded to said body member, said metal foil having first, second and third portions, said first portion of said foil covering at least a part of said first end portion of said body member, said second portion of said foil covering at least a part of said second end portion of said body member, and said third portion of said foil covering said center portion of said body member; and
   (c) soft plastic protective layer means, bonded to at least a part of said second portion of said metal foil, said protective layer means bonded to said second portion of said metal foil being adapted for forming a protective layer between said metal foil and the window of a vehicle at said second end portion of said body member.

25. A window molding as set forth in claim 24 wherein said first end portion includes an anchor means for coupling said window molding to the vehicle.

26. A window molding as set forth in claim 25 wherein said first portion of said metal foil extends into said anchor means.

27. A window molding as set forth in claim 25 wherein said first end portion includes an extension means for increasing the stiffness of said molding.

28. A window molding as set forth in claims 25, 26 or 27 wherein said second end portion is bent to increase the strength thereof.

29. A window molding as set forth in claims 25, 26 or 27 wherein said second end portion is thicker than said center portion whereby said second end portion is stiffened.

30. A window molding as set forth in claim 24 wherein said first end portion includes a leg means having a first part perpendicular to the end of the center portion and extending therefrom and a second part extending from the first part perpendicular thereto.

31. A window molding as set forth in claim 24 including a leg means extending from said center portion, said leg means including a first part extending from the center portion perpendicular thereto and a second part extending from the first part and perpendicular thereto.

32. A window molding as set forth in claim 31 wherein said first end portion is tapered to reduce wind resistance.

33. A window molding as set forth in claim 31 wherein said first end portion is positioned perpendicular to said center portion.

34. A window molding as set forth in claim 31 wherein said first end portion is bent to increase the strength thereof.

35. A window molding as set forth in claims 32, 33 or 34 wherein said second end portion is tapered to reduce wind resistance.

36. A window molding as set forth in claims 32, 33 or 34 wherein said second end portion is bent to increase the strength thereof.

37. A window molding as set forth in claim 24 including a leg means extending from said center portions said leg means including an anchor means at one end thereof.

38. A window molding as set forth in claim 37 wherein said first end portion is bent to increase the strength thereof.

39. A window molding as set forth in claim 37 wherein said first end portion is positioned perpendicular to said center portion.

40. A window molding as set forth in claim 37 wherein said first end portion is thicker than said center portion to increase the strength thereof.

41. A window molding as set forth in claims 38, 39 or 40 wherein said second end portion is thicker than said center portion to increase the strength thereof.

42. A window molding as set forth in claims 38, 39 or 40 wherein said second end portion is bent to increase the strength thereof.

43. The molding of claims 1 or 24, wherein the synthetic resin is ABS resin or polycarbonate resin.

44. The molding of claims 1 or 24 wherein the metal foil has a thickness in the range of from about 30 to about 200$\mu$.

45. The molding of claims 1 or 24, wherein the metal foil is coated with a thin film of polyvinyl chloride resin, cellulose acetate resin or butyrate resin.

46. The molding of claims 1 or 24, wherein the protective layer means of soft plastic material is soft polyvinyl chloride resin, vinyl acetate resin, or an ethylenevinyl acetate copolymer.

47. The molding of claims 1 or 24, wherein the protective layer means has a thickness in the range from about 0.2 mm to 2 mm.

48. A window molding as set forth in claim 30 wherein said second end portion is tapered for reducing wind resistance.

49. A window molding as set forth in claim 30 wherein said second end portion is bent to increase the strength thereof.

* * * * *